US008896764B2

(12) United States Patent
Hardacker et al.

(10) Patent No.: US 8,896,764 B2
(45) Date of Patent: Nov. 25, 2014

(54) SYSTEM AND METHOD FOR EFFECTIVELY PERFORMING A REMOTE CONTROL CONFIGURATION PROCEDURE

(75) Inventors: Robert Hardacker, Escondido, CA (US); Steven Richman, Parker, CO (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1783 days.

(21) Appl. No.: 11/717,324

(22) Filed: Mar. 13, 2007

(65) Prior Publication Data

US 2008/0225184 A1    Sep. 18, 2008

(51) Int. Cl.
*H04N 5/44* (2011.01)
*H04N 21/414* (2011.01)

(52) U.S. Cl.
CPC ...... *H04N 5/4403* (2013.01); *H04N 2005/4435* (2013.01); *H04N 2005/4437* (2013.01); *H04N 21/414* (2013.01)
USPC ............... 348/734; 725/37; 725/59; 725/100; 725/110; 725/131; 725/139; 725/151

(58) Field of Classification Search
USPC ............. 725/139, 59, 37, 100, 110, 131, 151; 348/734, E05.099
See application file for complete search history.

(56) References Cited

U.S. PATENT DOCUMENTS

| | | | |
|---|---|---|---|
| 5,977,963 A * | 11/1999 | Gaughan et al. | 715/716 |
| 6,637,028 B1 * | 10/2003 | Voyticky et al. | 725/42 |
| 6,809,779 B2 | 10/2004 | Chang et al. | |
| 2001/0033243 A1 * | 10/2001 | Harris et al. | 341/176 |
| 2002/0059610 A1 * | 5/2002 | Ellis | 725/58 |
| 2002/0097165 A1 * | 7/2002 | Hulme | 340/825.72 |
| 2002/0100055 A1 * | 7/2002 | Zeidman | 725/110 |
| 2002/0107716 A1 * | 8/2002 | Callahan et al. | 705/9 |
| 2002/0186324 A1 * | 12/2002 | Cheng | 348/706 |
| 2003/0036949 A1 * | 2/2003 | Kaddeche et al. | 705/14 |
| 2003/0095156 A1 * | 5/2003 | Klein et al. | 345/864 |
| 2003/0141987 A1 * | 7/2003 | Hayes | 340/825.72 |
| 2004/0070491 A1 * | 4/2004 | Huang et al. | 340/10.5 |
| 2004/0203590 A1 * | 10/2004 | Shteyn | 455/410 |
| 2005/0068222 A1 * | 3/2005 | Krzyzanowski et al. | 341/176 |
| 2005/0210525 A1 * | 9/2005 | Carle et al. | 725/105 |
| 2005/0228858 A1 * | 10/2005 | Mizutani et al. | 709/201 |
| 2006/0126537 A1 * | 6/2006 | Booth | 370/255 |
| 2006/0288370 A1 * | 12/2006 | Rothschild | 725/51 |
| 2007/0052547 A1 * | 3/2007 | Haughawout et al. | 340/825.22 |
| 2007/0124772 A1 * | 5/2007 | Bennett et al. | 725/61 |
| 2007/0296552 A1 * | 12/2007 | Huang et al. | 340/10.5 |
| 2008/0115189 A1 * | 5/2008 | Lejeune | 725/141 |
| 2008/0134165 A1 * | 6/2008 | Anderson et al. | 717/173 |
| 2012/0194325 A1 * | 8/2012 | Haughawout et al. | 340/12.28 |

* cited by examiner

*Primary Examiner* — Mulugeta Mengesha
(74) *Attorney, Agent, or Firm* — Gregory J. Koerner; Redwood Patent Law

(57) ABSTRACT

A system and method for effectively performing a remote control configuration procedure includes a settop box that receives electronic programming from a program source and a television that is configured to reproduce the electronic programming. A remote control device controls various functionalities of the television over an RC-TV communications link. The remote control configuration procedure is coordinated by the television and a configuration server to allow the remote control device to also control various functionalities of the settop box over an RC-STB communication link. The television and the configuration server support a user-friendly interactive procedure to automatically determine and provide certain settop-box control information for adding appropriate settop-box control functions to the remote control device during the remote control configuration procedure.

63 Claims, 11 Drawing Sheets

110

SYSTEM AND METHOD FOR EFFECTIVELY PERFORMING A REMOTE CONTROL CONFIGURATION PROCEDURE

BACKGROUND SECTION

1. Field of the Invention

This invention relates generally to techniques for controlling electronic devices, and relates more particularly to a system and method for effectively performing a remote control configuration procedure.

2. Description of the Background Art

Implementing effective methods for controlling electronic devices is a significant consideration for designers and manufacturers of contemporary electronic systems. However, effectively controlling electronic devices may create substantial challenges for system designers. For example, enhanced demands for increased control functionality and device performance may require more operating power and require additional hardware resources. An increase in power or hardware requirements may also result in a corresponding detrimental economic impact due to increased production costs and operational inefficiencies.

Furthermore, enhanced device capability to perform various advanced control operations may provide additional benefits to a system user, but may also place increased demands on the control and management of various system components. For example, an enhanced control system that effectively controls digital television systems may benefit from an efficient implementation because of the large amount and complexity of the digital data involved.

Due to growing demands on device control functionality and substantially increasing data magnitudes, it is apparent that developing new techniques for controlling electronic systems is a matter of concern for related electronic technologies. Therefore, for all the foregoing reasons, developing effective techniques for providing appropriate device-control functionality remains a significant consideration for designers, manufacturers, and users of contemporary electronic devices.

SUMMARY

In accordance with the present invention, a system and method are disclosed for effectively performing a remote control configuration procedure. In one embodiment, a television system includes a television (TV), a settop box (STB), a configuration server, and a remote control (RC) for controlling the television. In accordance with the present invention, the remote-control configuration procedure may be automatically performed to advantageously reconfigure the remote control with additional functionalities for also controlling the settop box.

Initially, a remote control configuration mode is entered in response to any predefined configuration trigger event. For example, a remote control configuration procedure may be automatically triggered when the television system is initially installed. Alternately, remote control configuration procedures may be manually triggered by a system user in response to any appropriate event or occurrence, such as the introduction of a different settop box into the television system.

An RC configuration module of the television automatically connects to the configuration server by utilizing any appropriate techniques. For example, the television may transmit a network login communication, including an Internet Protocol (IP) address, to the configuration server. An RC configuration manager of the configuration server responsively reads the IP address of the television, and then accesses a locale lookup table to determine a specific locale (approximate physical location) for the television based upon its corresponding IP address.

The RC configuration manager of the configuration server next accesses a vendor lookup table to determine one or more probable vendors for the particular settop box, based upon the locale of the television. The RC configuration manager of the configuration server then notifies the RC configuration module of the television regarding the probable vendor(s) of the settop box. The RC configuration module of the television responsively displays one or more simple leading questions on a local display to allow a system user to interactively confirm the actual vendor of the particular settop box in a non-demanding and user-friendly manner. The system user confirms the actual vendor of the settop box by utilizing any effective means. For example, the system user may utilize the remote control to respond to the vendor question(s) presented upon the television.

The RC configuration module of the television confirms the actual vendor of the settop box to the RC configuration manager of the configuration server. The RC configuration manager responsively accesses an STB-model lookup table to determine appropriate STB model information for the different possible settop boxes based upon the vendor information previously provided by the television. The STB model information may include any relevant types of information. For example, the STB model information may include model numbers and digital images for the different types of settop boxes supported by the vendor at that specific locale.

The RC configuration manager of the configuration server uploads the STB model information to the television. In response, the RC configuration module of the television displays the received STB model information, and also displays one or more simple leading questions to allow the system user to interactively confirm the actual model of the settop box in a non-demanding and user-friendly manner. For example, in certain embodiments, the television may display, either sequentially or simultaneously, digital images of the different types of settop boxes currently supported by the vendor at that specific locale.

The system user may then confirm the actual model of the settop box in any effective and appropriate manner. For example, in certain embodiments, the system user may utilize the remote control to simply select the displayed digital image that resembles the settop box of the television system. The RC configuration module of the television then confirms the actual model of the settop box to the RC configuration manager of the configuration server. The RC configuration manager responsively accesses a control-information lookup table to determine appropriate STB control information for the identified model of the settop box model. The STB control information may include any relevant types of information. For example, the STB control information may include, but is not limited to, specific control codes to support various functions of the particular settop box.

The RC configuration manager of the configuration server uploads the appropriate identified STB control information to the television which may then responsively provide the received STB control information to the remote control by utilizing any appropriate transmission techniques or methods. For example, the television may transfer the STB control information to the remote control by utilizing low-speed or high-speed radio-frequency transmissions. In certain embodiments, the television may alternately transfer the STB control information to the remote control by utilizing any effective Near-Field Communication (NFC) techniques or possibly infrared (IR) communication techniques.

A RC configuration controller of the remote control may then utilize the received STB control information to advantageously update remote control functionalities of the remote control to thereby support controlling both the settop box and the television. Finally, the system user may utilize the updated remote control functionality to effectively control the settop box. For at least the foregoing reasons, the present invention thus provides an improved system and method for effectively performing a remote control configuration procedure.

DETAILED DESCRIPTION

The present invention relates to an improvement in remote control systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing a remote control configuration procedure, and includes a settop box that receives electronic programming from a program source and a television that is configured to reproduce the electronic programming. A remote control device controls various functionalities of the television over an RC-TV communications link. The remote control configuration procedure is coordinated by the television and a configuration server to allow the remote control device to also control various functionalities of the settop box over an RC-STB communication link. The television and the configuration server support a user-friendly interactive procedure to automatically determine and provide certain settop-box control information for adding appropriate settop-box control functions to the remote control device during the remote control configuration procedure.

Figure 1:
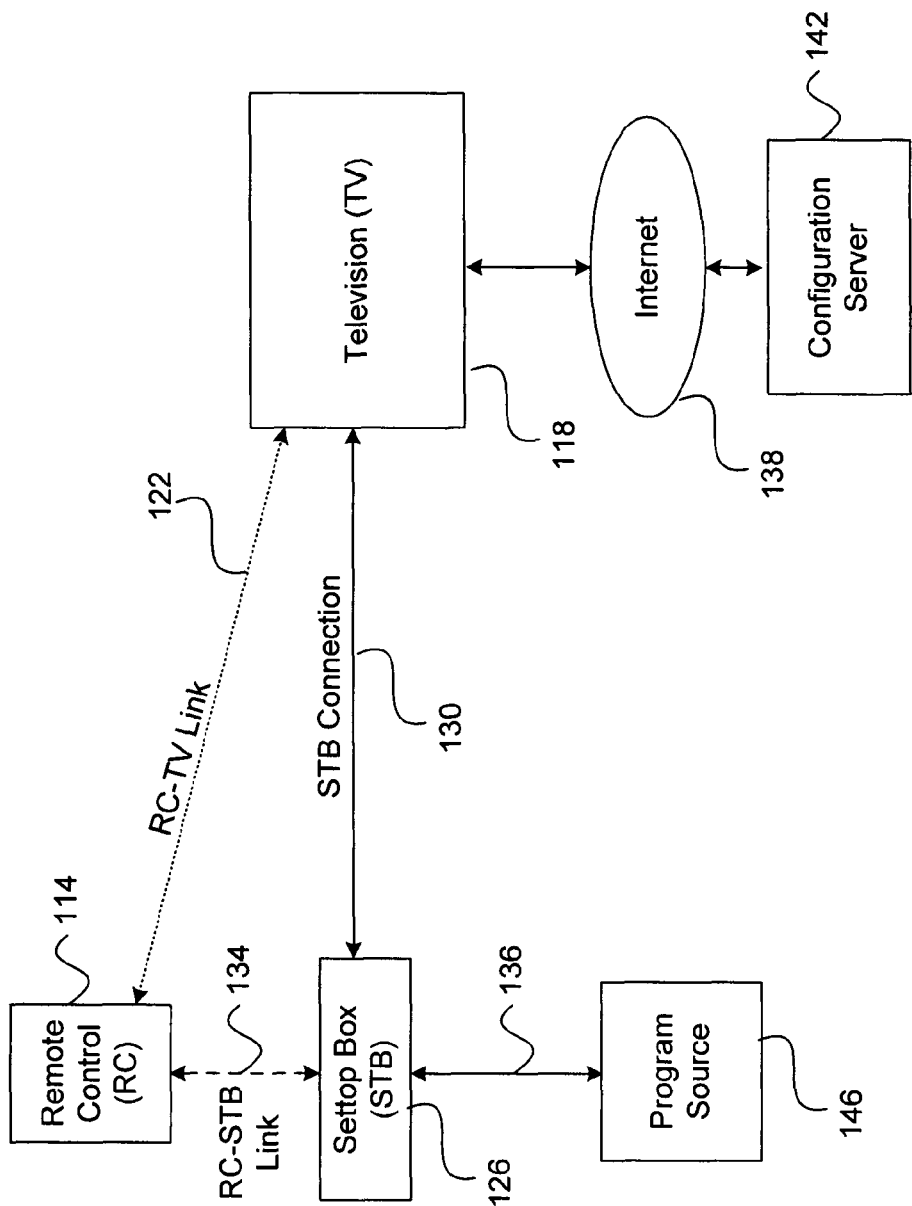
FIG. 1 is a block diagram of a television system, in accordance with one embodiment of the present invention.

Referring now to FIG. 1, a block diagram of a television system 110 is shown, in accordance with one embodiment of the present invention. In the FIG. 1 embodiment, television system 110 may include, but is not limited to, a remote control (RC) 114, a television (TV) 118, a settop box (STB) 126, a configuration server 142, and a program source 146. In alternate embodiments, television system 110 may be implemented using components and configurations in addition to, or instead of, certain of those components and configurations discussed in conjunction with the FIG. 1 embodiment.

In the FIG. 1 embodiment, remote control 114 is implemented to provide appropriate control functionalities for utilizing television 118 in an optimal manner. However, in accordance with the present invention, remote control 114 may be advantageously configured through a remote control configuration procedure to also control the operation of settop box (STB) 126 in an effective and efficient manner. The inconvenience and confusion potentially caused by requiring multiple different remote control devices to operate television system 110 is thus alleviated, while still retaining optimal control functionalities to fully support various enhanced options and operational modes for television 118.

In the FIG. 1 embodiment, remote control 114 may bi-directionally and wirelessly communicate with television 118 via RC-TV link 122 by utilizing any appropriate communication techniques. For example, in certain embodiments, remote control 114 may provide low-speed control information to television 118 by utilizing infrared (IR) transmission techniques. In addition, in certain embodiments, remote control 114 and television 118 may directly communicate with each other over RC-TV link 122 by utilizing appropriate low-speed or high-speed radio-frequency (RF) transmission techniques to transfer any desired types of electronic information.

In the FIG. 1 embodiment, remote control 114 may also bi-directionally and wirelessly communicate with STB 126 via STB-RC link 134 by utilizing any appropriate communication techniques. For example, in certain embodiments, remote control 114 may provide low-speed control information to STB 126 by utilizing infrared (IR) transmission techniques. In addition, in certain embodiments, remote control 114 and STB 126 may directly communicate with each other over RC-STB link 134 by utilizing appropriate radio-frequency (RF) transmission techniques to transfer any desired types of electronic information.

In the FIG. 1 embodiment, STB 126 may be implemented as any type of electronic device to perform any desired types of functions for television system 110. For example, STB 126 may include, but is not limited to, a cable television settop box and/or a satellite television settop box. In the FIG. 1 embodiment, STB 126 typically receives electronic content from a program source 146 or other appropriate entity via path 136. STB 126 may then provide the electronic content to television 118 via STB connection 130.

In accordance with the present invention, program source 146 may include any appropriate functionalities or entities. For example, program source 146 may include, but is not limited to, a cable broadcasting network and/or a satellite broadcasting network. In addition, the foregoing content may include, but is not limited to, entertainment programming, movies, video data, audio data, digital photographs, still image data, graphics, web pages, program guide information, video games, and various types of software programs.

In the FIG. 1 embodiment, television 118 may be coupled through the Internet 138 (or other connecting entity) to a configuration server 142 that provides various types of configuration support and configuration functionalities for automatically performing a configuration procedure to flexibly configure remote control 114. For example, in certain embodiments, appropriate RC configuration information may be automatically determined and provided to remote control 114 through television 118 and RC-TV link 122 to thereby allow remote control 114 to advantageously expand its control functionality to include STB 126.

In certain embodiments, the foregoing remote control configuration procedure may be performed in a user-friendly manner by implementing television system 110 to automatically perform most of the configuration procedures without direct involvement by the system user. For example, in certain embodiments, user input during the remote control configuration procedure may be limited to answering a minimal number of simple leading questions after being prompted by a user interface displayed on television 118. In certain embodiments, the foregoing questions may be limited to easy yes/no questions whose answers are either "yes" or "no."

The FIG. 1 embodiment of the present invention is described in the context of STB 126 and television system 110. However, the concepts and principles of the present invention may be readily applied to any suitable type of electronic devices or systems that are remotely controllable. Various techniques for optimally configuring remote control 114 are further discussed below in conjunction with FIGS. 8 through 9C.

Figure 2:
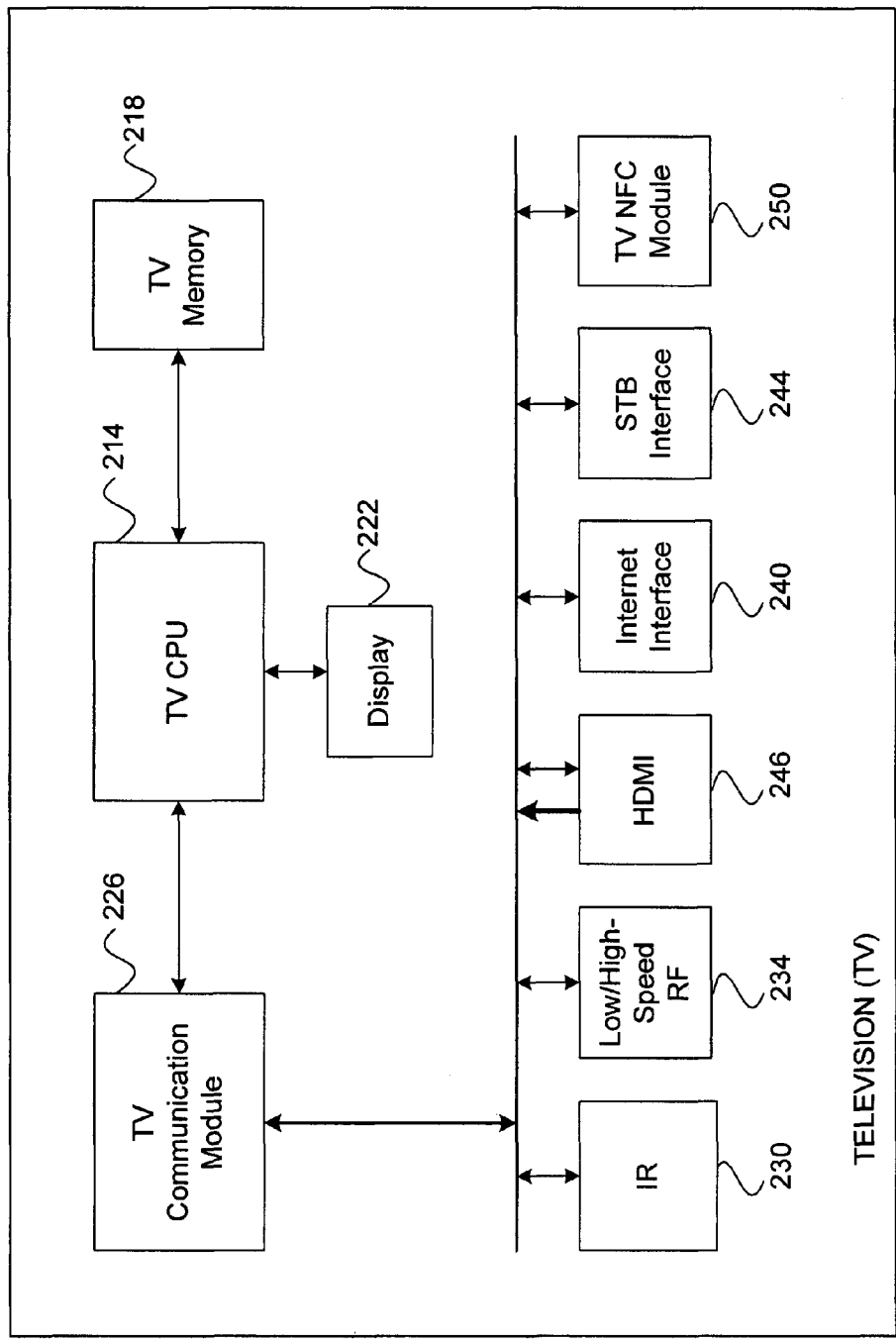
FIG. 2 is a block diagram for one embodiment of the television of FIG. 1, in accordance with the present invention.

Referring now to FIG. 2, a block diagram for one embodiment of the FIG. 1 television 118 is shown, in accordance with the present invention. In alternate embodiments, television 118 may include components and configurations in addition to, or instead of, certain of those components and configurations discussed in conjunction with the FIG. 2 embodiment.

In the FIG. 2 embodiment, television 118 includes a TV central processing unit (TV CPU) 214 that may be implemented to include any appropriate and compatible microprocessor device (including system-on-chip (SOC) architectures). In the FIG. 2 embodiment, TV CPU 214 preferably executes software instructions from one or more software programs to thereby control and manage the operation of television 118. In the FIG. 2 embodiment, TV memory 218 may be implemented to include any combination of desired storage devices, including, but not limited to, read-only memory (ROM), random-access memory (RAM), and various types of non-volatile memory, such as floppy disks or hard disks. In the FIG. 2 embodiment, display 222 may be implemented in any effective manner to display appropriate visual information for television 118.

In the FIG. 2 embodiment, television 118 includes a TV communication module 226 that cooperates with TV CPU 214 to perform and coordinate various types of bi-directional wireless and wired communications between television 118 and other entities. The FIG. 2 embodiment also includes a series of TV input/output interfaces that TV communication module 226 may utilize to receive and/or transmit any required types of information. For example, in the FIG. 2 embodiment, the TV input/output interfaces include, but are not limited to, an infrared (IR) interface 230, a low/high-speed radio frequency (RF) interface 234, a High-Definition Multimedia Interface (HDMI) 246, an Internet interface 240, a settop box (STB) interface 244, and a TV Near-Field Communications (NFC) module 250.

In the FIG. 2 embodiment, TV communication module 226 may utilize IR interface 230 to receive control information and other appropriate information from remote control 114 (FIG. 1) by utilizing any effective infrared transmission techniques. In certain embodiments, IR interface 230 may also transmit infrared information to remote control 114. In the FIG. 2 embodiment, TV communication module 226 may optionally utilize low/high-speed RF interface 234 to bi-directionally and wirelessly communicate with remote control 114 by utilizing any effective low-speed or high-speed RF transmission techniques at any appropriate frequencies. For example, in the FIG. 2 embodiment, high-speed RF transmissions may operate in the approximate range of 100 megabits-per-second. In certain embodiments, television 118 may utilize low/high-speed RF interface 234 to transfer RC configuration information to remote control 114 during a remote control configuration procedure, as discussed above in conjunction with FIG. 1.

In the FIG. 2 embodiment, TV communication module 226 may utilize HDMI 246 to effectively perform various data transfer operations for securely transferring digital audio and video data. In the FIG. 2 embodiment, TV communication module 226 may utilize Internet interface 240 to perform any compatible network data-transfer procedures to any appropriate types of distributed computer networks, including, but not limited to, the Internet. In the FIG. 2 embodiment, television 118 may utilize Internet interface 240 to bi-directionally communicate with configuration server 142 (FIG. 1). In the FIG. 2 embodiment, TV communication module 226 may utilize STB interface 244 to effectively perform various types of data transfer operations with STB 126 (FIG. 1).

In the FIG. 2 embodiment, TV communication module 226 may utilize TV NFC module 250 to effective perform various Near-Field Communications (NFC) operations to transfer appropriate electronic information. For example, in certain embodiments, television 118 may utilize TV NFC module 250 to transfer RC configuration information to remote control 114 during a remote control configuration procedure as discussed above in conjunction with FIG. 1. In certain embodiments, TV NFC module 250 may be implemented in accordance with a known Sony FeliCa technology to transfer remote control configuration information to remote control 114. The implementation and utilization of television 118 are further discussed below in conjunction with FIG. 3 and FIGS. 8 through 9C.

Figure 3:
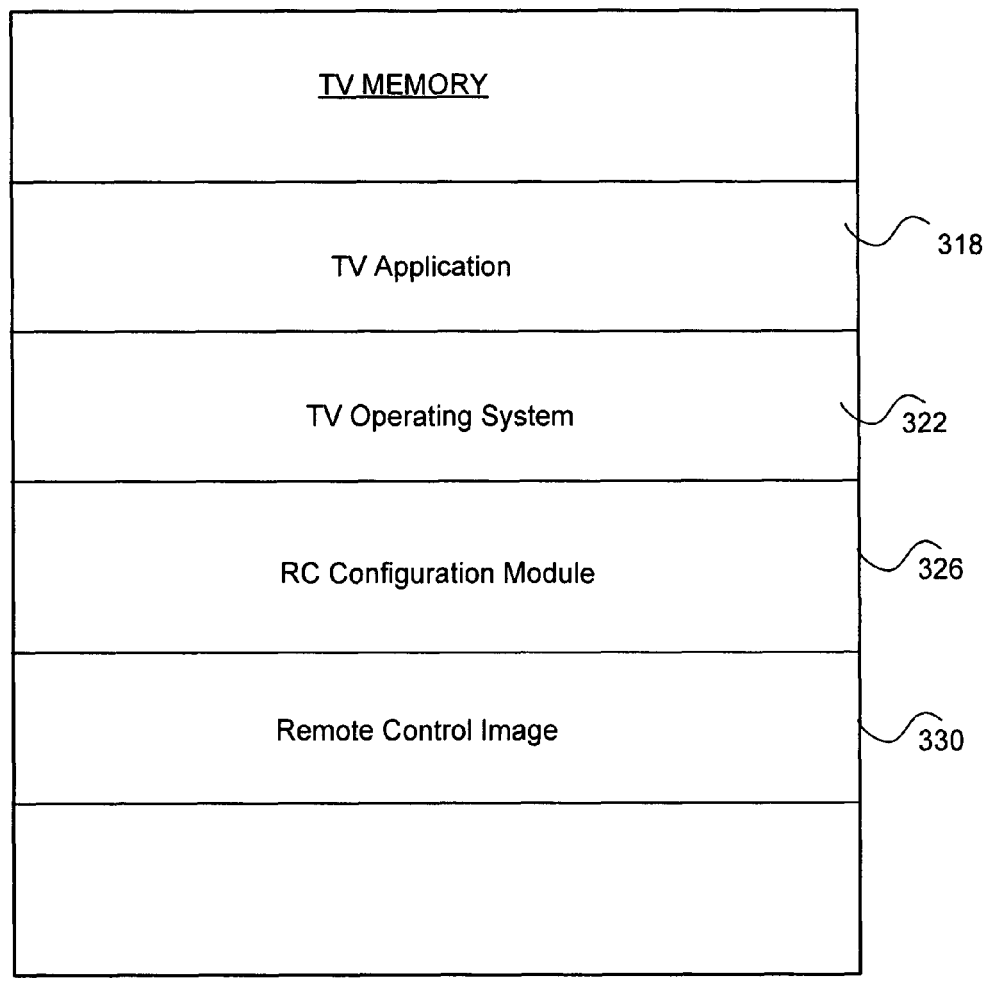
FIG. 3 is a block diagram for one embodiment of the TV memory of FIG. 2, in accordance with the present invention.

Referring now to FIG. 3, a block diagram of a TV memory 218 from the FIG. 2 television 118 is shown, in accordance with one embodiment of the present invention. In the FIG. 3 embodiment, TV memory 218 includes, but is not limited to, a TV application 318, a TV operating system 322, an RC configuration module 326, and a remote control image 330. The FIG. 3 embodiment is presented for purposes of illustration, and in alternate embodiments, TV memory 218 may be implemented using components and configurations in addition to, or instead of, certain of those components and configurations discussed in conjunction with the FIG. 3 embodiment.

In the FIG. 3 embodiment, TV memory 218 stores a TV application 318 which includes program instructions that are executed by TV CPU 214 (FIG. 2) to perform various functions and operations for television 118. The particular nature and functionality of TV application 318 typically varies depending upon factors such as the specific type and functionality of the corresponding television 118. In the FIG. 3 embodiment, TV memory 218 may also store a TV operating system 322 that controls and coordinates low-level functionality of television 118.

In the FIG. 3 embodiment, TV memory 218 may also include an RC configuration module 326 with program instructions that TV CPU 214 executes to support various remote control configuration procedures to effectively provide additional control functionality for remote control 114, as discussed above in conjunction with FIG. 1. In addition, in certain embodiments of the present invention, TV memory 218 may store a remote control image 330 for display upon display 222 of television system 110. RC configuration module 326 may then utilize the displayed remote control image 330 to assist the system user in determining reconfigured control button functionality for remote control 114. Various techniques for supporting the utilization of a reconfigured remote control 114 are further discussed below in conjunction with FIG. 8.

Figure 4:
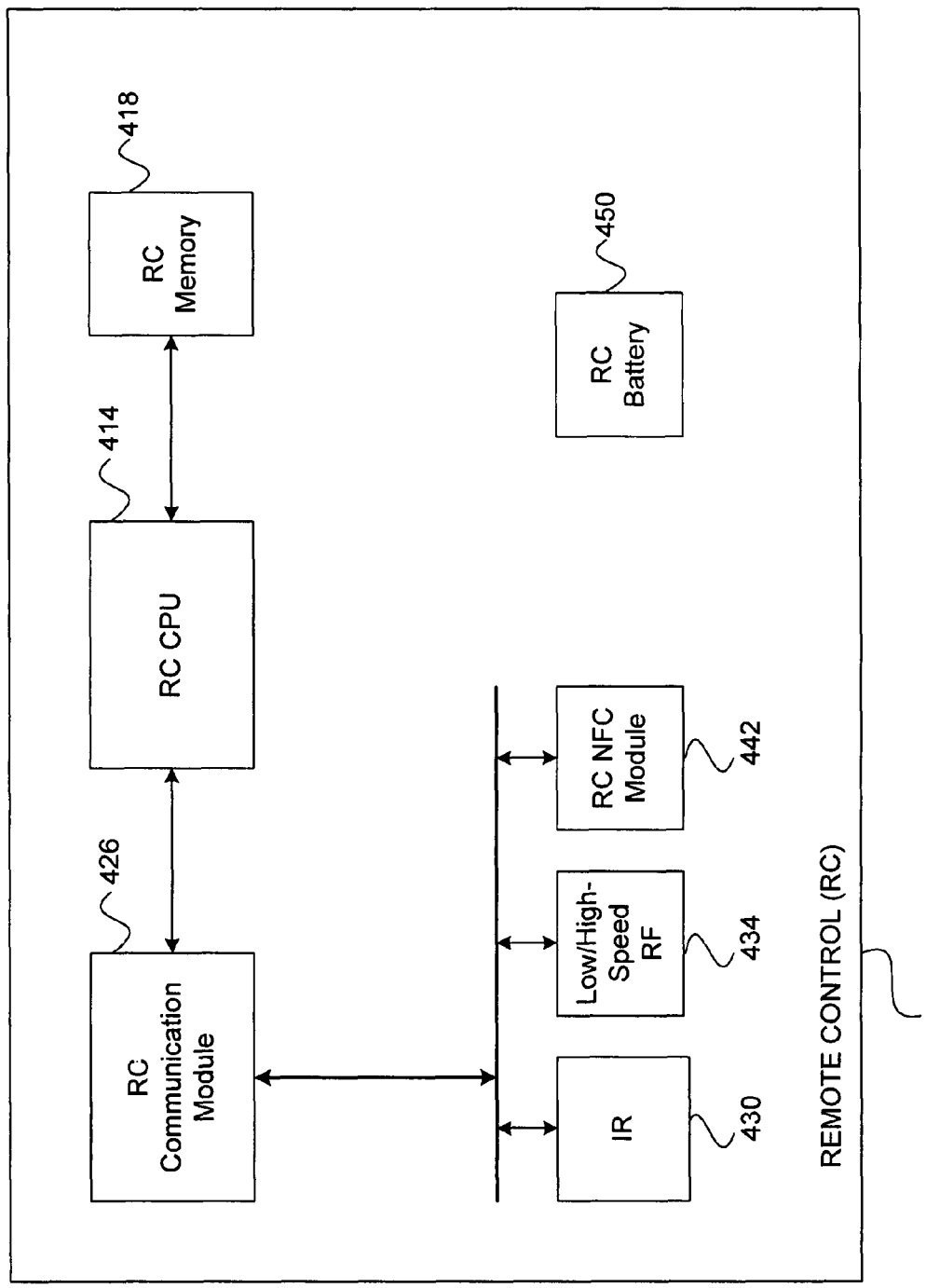
FIG. 4 is a block diagram for one embodiment of the remote control of FIG. 1, in accordance with the present invention.

Referring now to FIG. 4, a block diagram for one embodiment of the FIG. 1 remote control (RC) 114 is shown, in accordance with the present invention. In alternate embodiments, remote control 114 may include components and configurations in addition to, or instead of, certain of those components and configurations discussed in conjunction with the FIG. 4 embodiment.

In the FIG. 4 embodiment, remote control 114 includes a remote control central processing unit (RC CPU) 414 that may be implemented to include any appropriate and compatible microprocessor device. In the FIG. 4 embodiment, RC CPU 414 preferably executes software instructions from one or more applications programs to thereby control and manage the operation of remote control 114. In the FIG. 4 embodiment, RC memory 418 may be implemented to include any combination of desired storage devices, including, but not limited to, read-only memory (ROM), random-access memory (RAM), and various types of non-volatile memory.

In the FIG. 4 embodiment, remote control 114 includes an RC communication module 426 that cooperates with RC CPU 414 to perform and coordinate various types of bi-directional wireless and wired communications between remote control 114 and other entities. The FIG. 4 embodiment also includes a series of RC input/output interfaces that RC communication module 426 may utilize to receive and/or transmit any required types of information. For example, in the FIG. 4 embodiment, the RC input/output interfaces include, but are not limited to, an infrared (IR) interface 430, a low/high-speed radio frequency (RF) interface 434, and an RC Near-Field Communications (NFC) module 442.

In the FIG. 4 embodiment, RC communication module 426 may utilize IR interface 430 to send control information and other appropriate information directly to television 118 (FIG. 1) by utilizing any effective infrared transmission techniques. In certain embodiments, IR interface 330 may also receive infrared information from television 118 or other external entities. In the FIG. 4 embodiment, RC communication module 426 may utilize low/high-speed RF interface 434 to bi-directionally and wirelessly communicate with television 118 or STB 126 by utilizing any effective RF transmission techniques at any appropriate low or high RF frequencies. In certain embodiments, remote control 114 may utilize low/high-speed RF interface 434 to transfer RC configuration information from television 118 during a remote control configuration procedure as discussed above in conjunction with FIG. 1.

In the FIG. 4 embodiment, RC communication module 426 may utilize RC NFC module 442 to effective perform various Near-Field Communications (NFC) operations to transfer appropriate electronic information. For example, in certain embodiments, remote control 114 may utilize RC NFC module 442 to transfer RC configuration information from television 118 during a remote control configuration procedure as discussed above in conjunction with FIG. 1. In certain embodiments, RC NFC module 442 may be implemented in accordance with a known Sony FeliCa technology to transfer remote control configuration information from television 118. Effective techniques for automatically reconfiguring remote control 114 are further discussed below in conjunction with FIGS. 8 through 9C.

Figure 5:
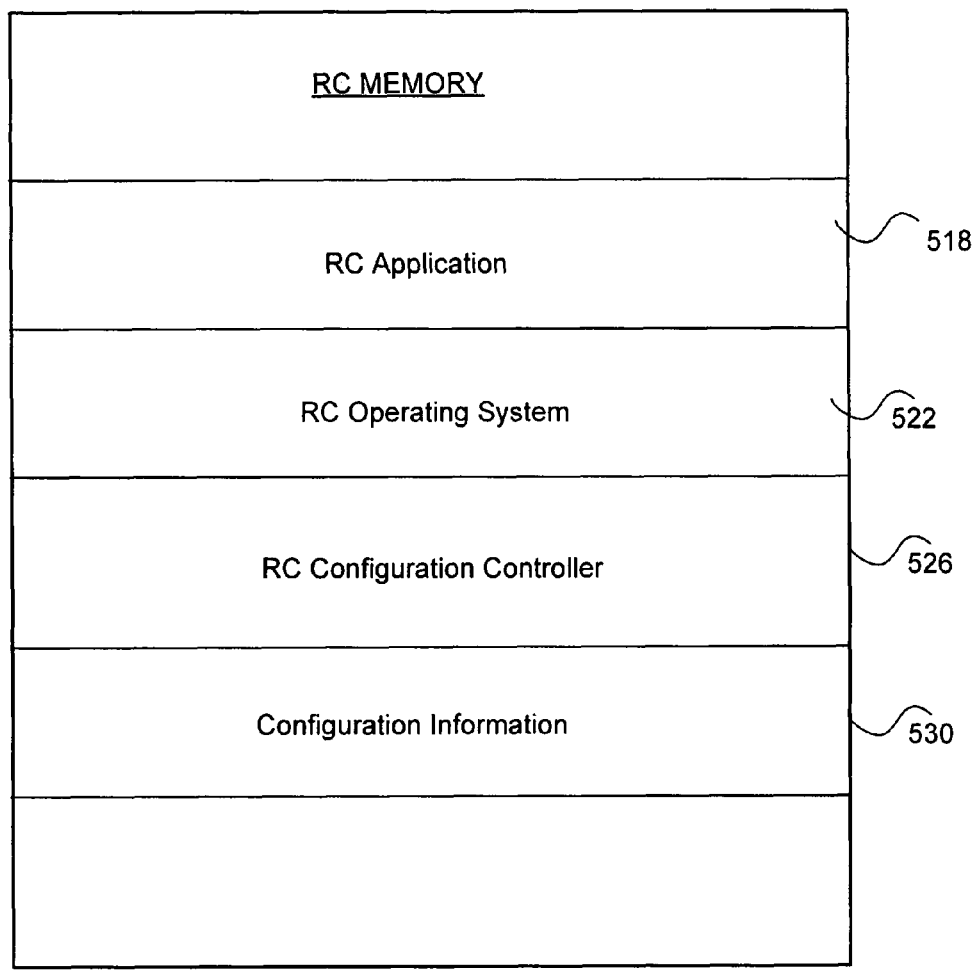
FIG. 5 is a block diagram for one embodiment of the RC memory of FIG. 4, in accordance with the present invention.

Referring now to FIG. 5, a block diagram of the RC memory 418 from the FIG. 4 remote control 114 is shown, in accordance with one embodiment of the present invention. In the FIG. 5 embodiment, RC memory 418 includes, but is not limited to, an RC application 518, an RC operating system 522, an RC configuration controller 526, and configuration information 530. The FIG. 5 embodiment is presented for purposes of illustration, and in alternate embodiments, RC memory 418 may be implemented using components and configurations in addition to, or instead of, certain of those components and configurations discussed in conjunction with the FIG. 5 embodiment.

In the FIG. 5 embodiment, RC memory 418 stores an RC application 518 which includes program instructions that are executed by RC CPU 414 (FIG. 4) to perform various functions and operations for remote control 114. The particular nature and functionality of RC application 518 typically varies depending upon factors such as the specific type and functionality of the corresponding remote control 114. In the FIG. 5 embodiment, RC memory 418 may also store an RC operating system 522 that controls and coordinates low-level functionality of remote control 114.

In the FIG. 5 embodiment, RC memory 418 may also include an RC configuration controller 526 with program instructions that RC CPU 414 executes to support various remote control configuration procedures to effectively provide additional control functionality for remote control 114, as discussed above in conjunction with FIG. 1. In addition, in certain embodiments of the present invention, RC memory 418 may store configuration information 530 that specifies various parameters for the control functionalities of remote control 114. For example, in certain embodiments, configuration information 530 may include control codes that remote control 114 transmits to control the operation of various associated devices.

Figure 6:
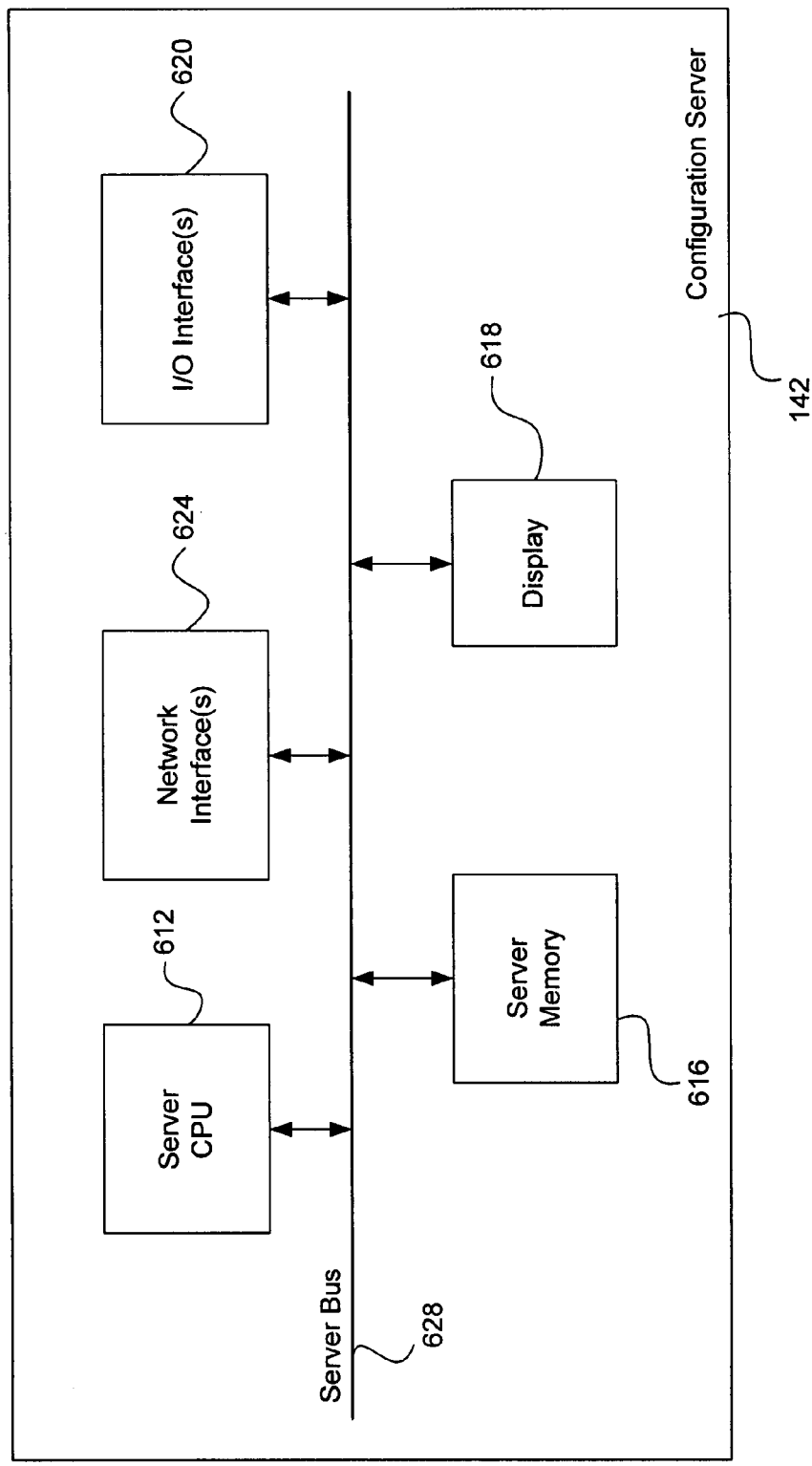
FIG. 6 is a block diagram for one embodiment of the configuration server of FIG. 1, in accordance with the present invention.

Referring now to FIG. 6, a block diagram for one embodiment of the FIG. 1 configuration server 142 is shown, in accordance with the present invention. In the FIG. 6 embodiment, configuration server 142 includes, but is not limited to, a server central processing unit (server CPU) 612, a server memory 616, a display 618, input/output interface(s) (I/O interface(s)) 620, and one or more network interfaces 624. The foregoing components of configuration server 142 may be coupled to, and communicate through, a server bus 628. In various embodiments, configuration server 142 may be implemented using components and configurations in addition to, or instead of, certain of those components and configurations discussed below in conjunction with the FIG. 6 embodiment.

In the FIG. 6 embodiment, server CPU 612 may be implemented to include any appropriate and compatible processor device that executes software instructions to control and manage the operations of configuration server 142. The FIG. 8 display 618 may include any effective type of display technology including a cathode-ray-tube monitor or a liquid-crystal display device. In the FIG. 6 embodiment, I/O interface(s) 620 may include one or more input and/or output interfaces to receive and/or transmit any required types of information to or from configuration server 142. In addition, configuration server 142 may include one or more network interfaces 624 to communicate with the Internet or other electronic networks.

In the FIG. 6 embodiment, server memory 616 may be implemented to include any combination of desired storage devices, including, but not limited to, read-only memory (ROM), random-access memory (RAM), and various types of non-volatile memory, such as floppy disks or hard disks. In certain embodiments of the present invention, various configuration functions discussed herein with respect to configuration server 142 may alternately be performed by television 118. Additional details regarding the functionality and implementation of configuration server 142 are further discussed below in conjunction with FIGS. 7 and 9A-C.

Figure 7:
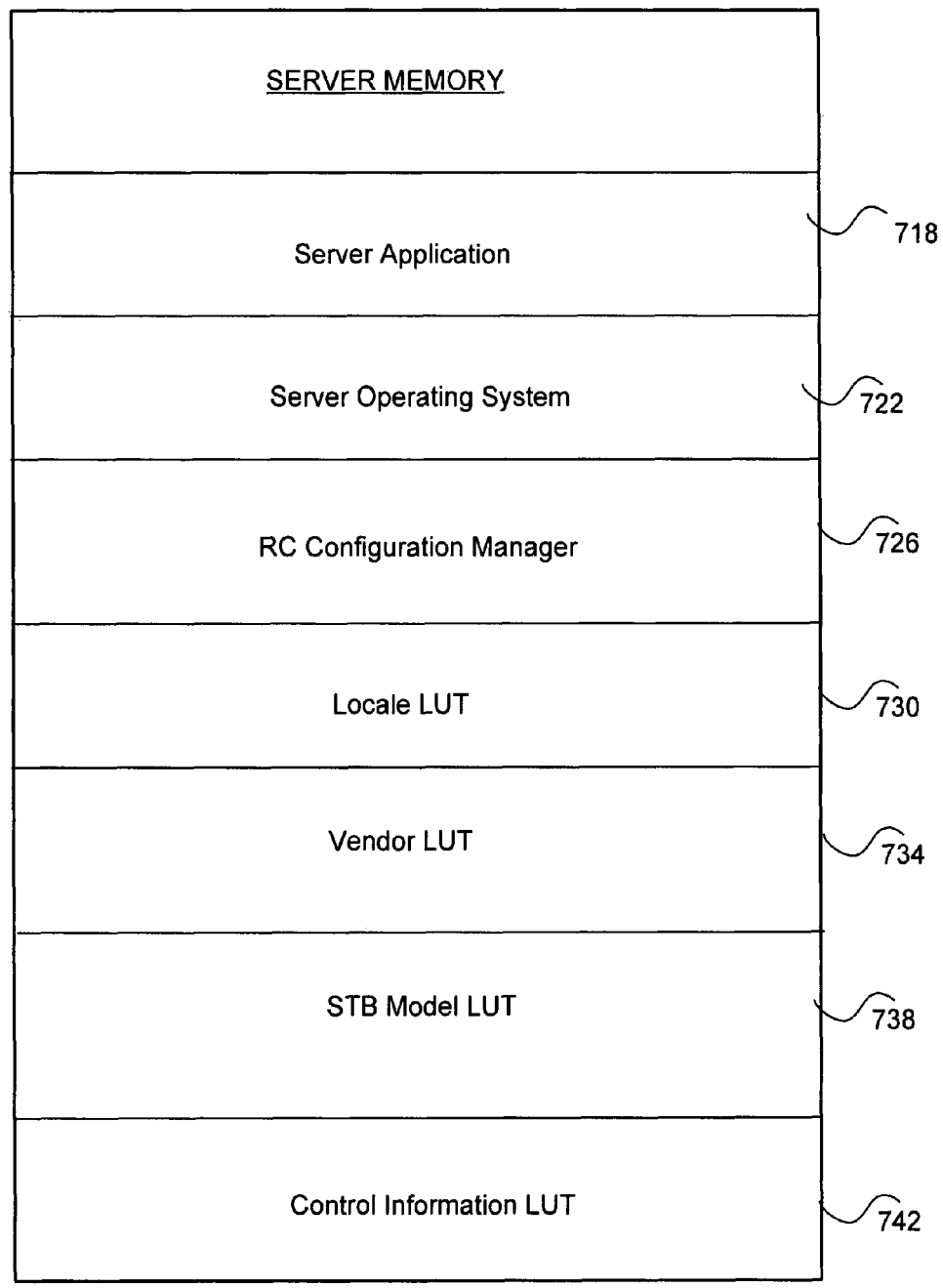
FIG. 7 is a block diagram for one embodiment of the server memory of FIG. 6, in accordance with the present invention.

Referring now to FIG. 7, a block diagram of the FIG. 6 server memory 616 is shown, in accordance with one embodiment of the present invention. In the FIG. 6 embodiment, server memory 616 includes, but is not limited to, server application software 718, a server operating system 722, an RC configuration manager 716, a locale lookup table (LUT) 730, a vendor lookup table (LUT) 734, an STB model lookup table (LUT) 738, and a control information lookup table (LUT) 742. In alternate embodiments, server memory 616 may be implemented using components and configurations in addition to, or instead of, certain of those components and configurations discussed in conjunction with the FIG. 7 embodiment.

In the FIG. 7 embodiment, server application 718 may include program instructions that are preferably executed by server CPU 612 (FIG. 6) to perform various functions and operations for configuration server 142. The particular nature and functionality of server application 718 typically varies depending upon factors such as the specific type and use of the corresponding configuration server 142. In the FIG. 7 embodiment, server operating system 722 controls and coordinates low-level functionality of configuration server 142.

In the FIG. 7 embodiment, configuration server 142 may utilize RC configuration manager 726 to support remote control configuration procedures, as discussed above in conjunction with FIG. 1. For example, in the FIG. 7 embodiment, RC configuration manager 726 may utilize information from locale LUT 730, vendor LUT 734, STB Model LUT 738, and control information LUT 742 to support remote control configuration procedures. The effective utilization of lookup tables 730, 734, 738, and 742 by RC configuration manager 726 is further discussed below in conjunction with FIGS. 9A through 9C.

Figure 8:
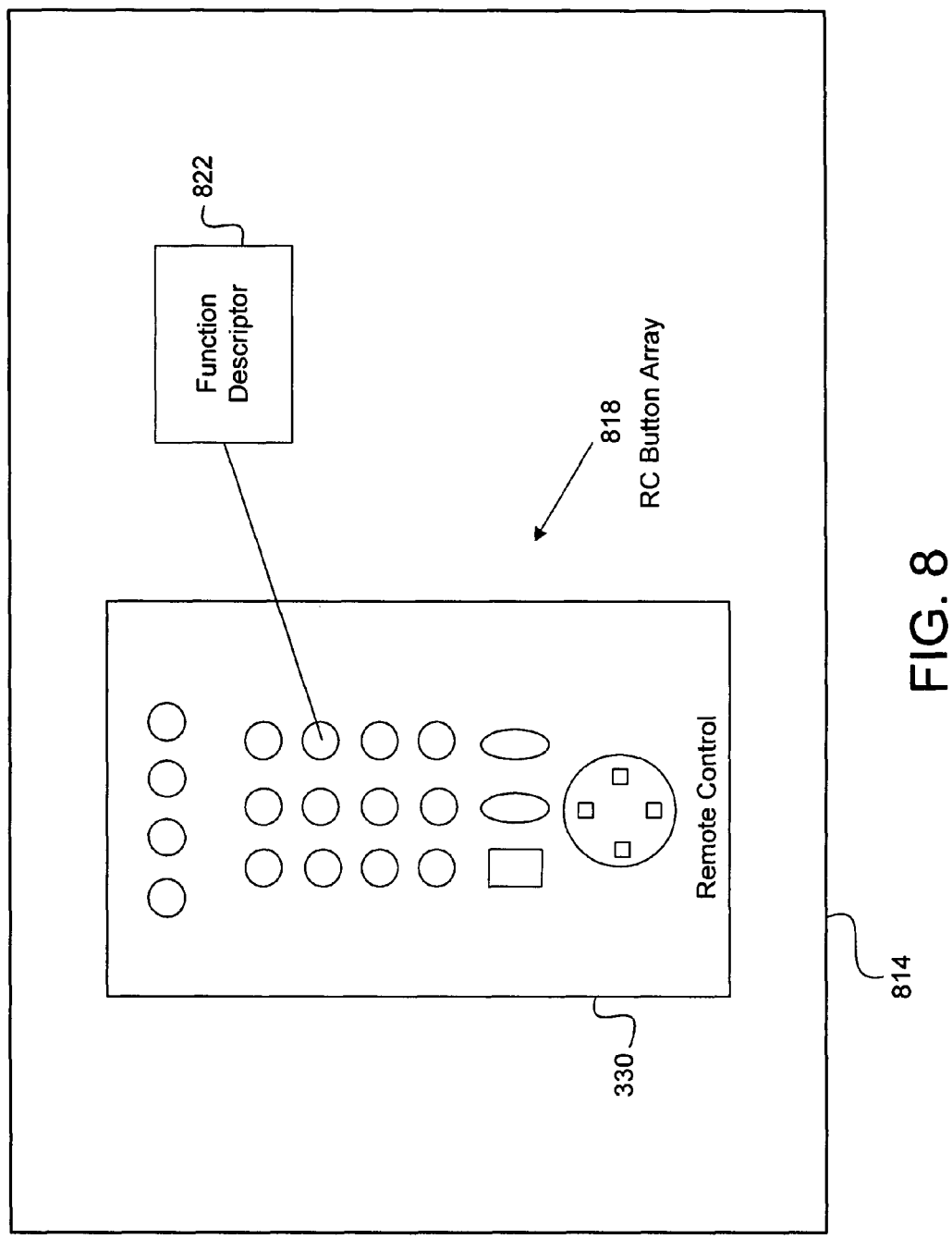
FIG. 8 is a diagram of an RC function GUI, in accordance with one embodiment of the present invention.

Referring now to FIG. 8, a diagram of an RC function graphical-user-interface (RC function GUI) 814 is shown, in accordance with one embodiment of the present invention. The FIG. 8 embodiment is presented for purposes of illustration, and in alternate embodiments, RC function GUI 814 may be implemented using components and configurations in addition to, or instead of, certain of those components and configurations discussed in conjunction with the FIG. 8 embodiment.

In the FIG. 8 embodiment, television 118 (FIG. 1) may store a remote control image 330 in a local TV memory 218 for presentation upon display 222 of television 118. RC configuration module 326 may then utilize the displayed remote control image 330 to assist the system user in determining reconfigured control button functionality for remote control 114 after a remote control configuration procedure has been concluded. For example, RC function GUI 814 may advantageously be generated upon a display screen of display 222 for visually presenting to a system user a graphical representation showing an RC button array 818 from remote control 114. RC button array 818 of the FIG. 8 embodiment is presented for purposes of illustration, and in alternate embodiments, any other appropriate configuration of buttons or other effective control means are equally contemplated.

In various embodiments, the altered functionality of each of the buttons or other control means on remote control 330 may be indicated on RC function GUI 814 by utilizing any appropriate techniques or methods. In the FIG. 8 embodiment, a system user may utilize remote control 114 to scroll to, or otherwise position, a cursor upon a desired button or other control means. In response, RC configuration module 326 of television 118 may generate function descriptor 822 upon RC function GUI 814 to indicate the particular functionality of that specific button as a result of the remote control configuration procedure. For example, function descriptor 822 may describe a special operational function of STB 126, such as "activate pay-per-view session."

In certain alternate embodiments, RC function GUI 814 may simply provide static descriptions for each of the new functions of RC button array 818. Alternately, in embodiments in which remote control 114 can be switched to different control modes that each corresponding to a different respective electronic device, the FIG. 8 function descriptor 822 may present an itemized list of different control functions that a particular button controls for the different respective devices. In addition, a currently-active control function on the itemized list may be visually highlighted in any effective manner. RC function GUI 814 therefore provides an effective means for a system user to determine changed functionality of remote control 114 after a remote control configuration procedure.

Figure 9A:
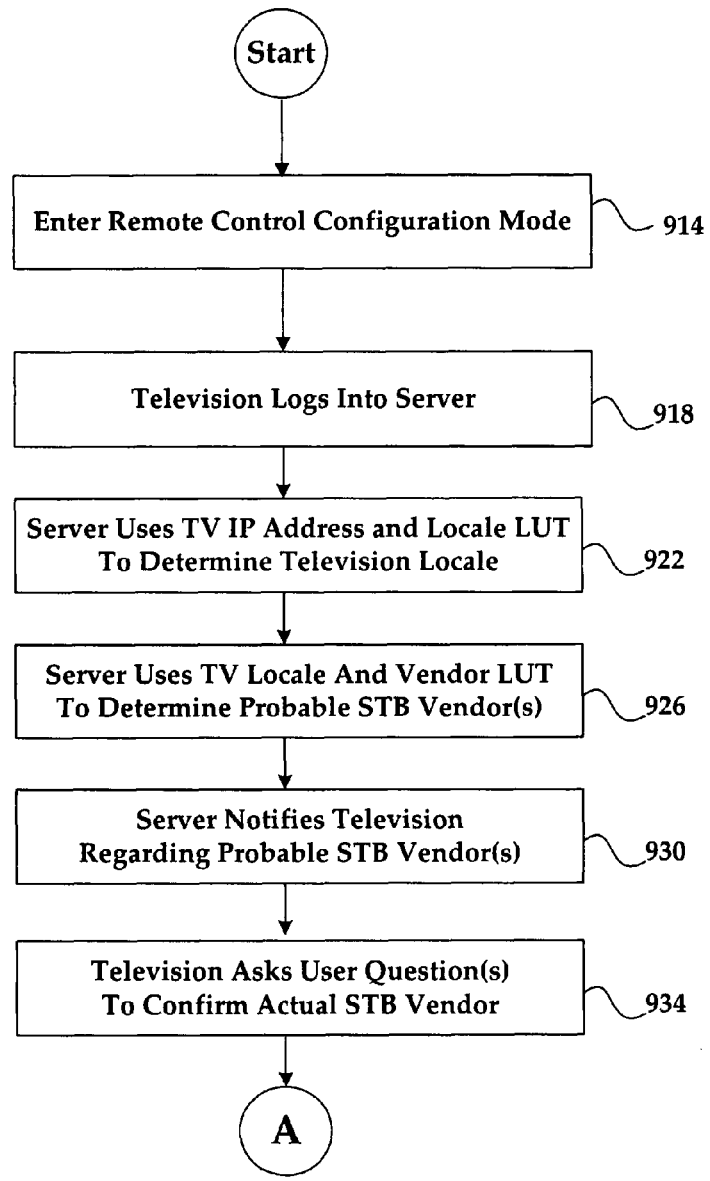
FIGS. 9A through 9C present a flowchart of method steps for performing a remote control configuration procedure, in accordance with one embodiment of the present invention.
Figure 9B:
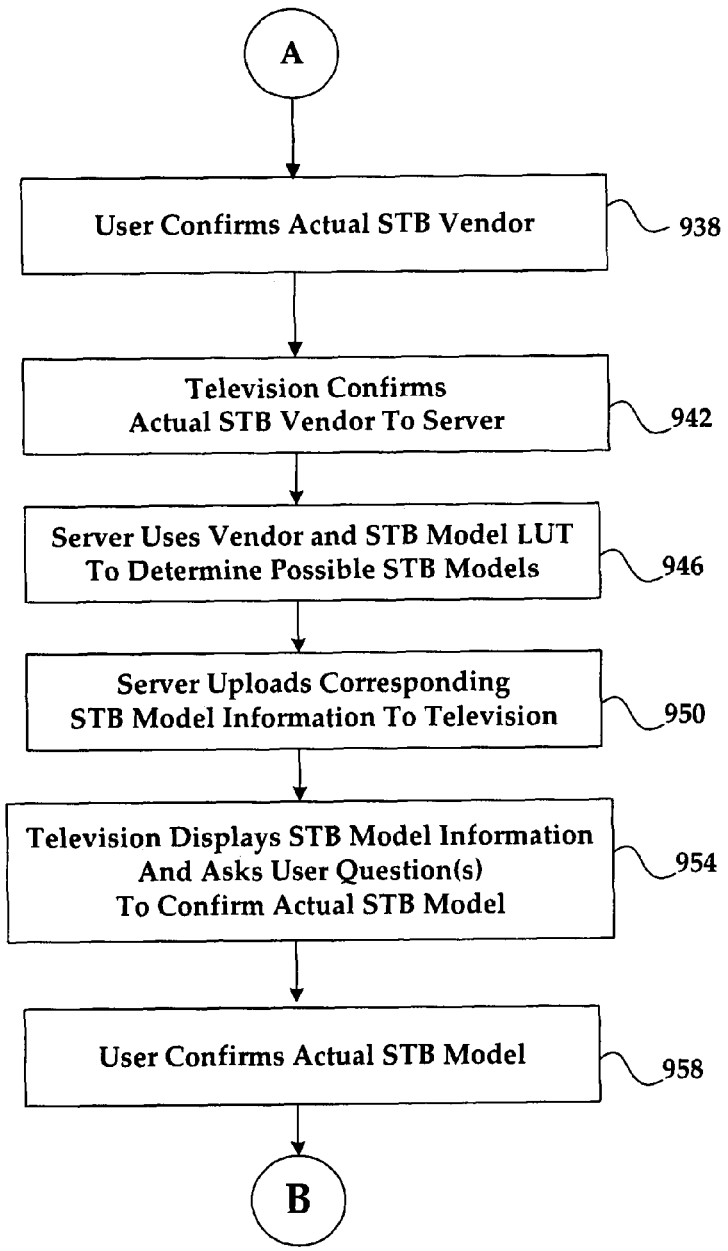
Figure 9C:
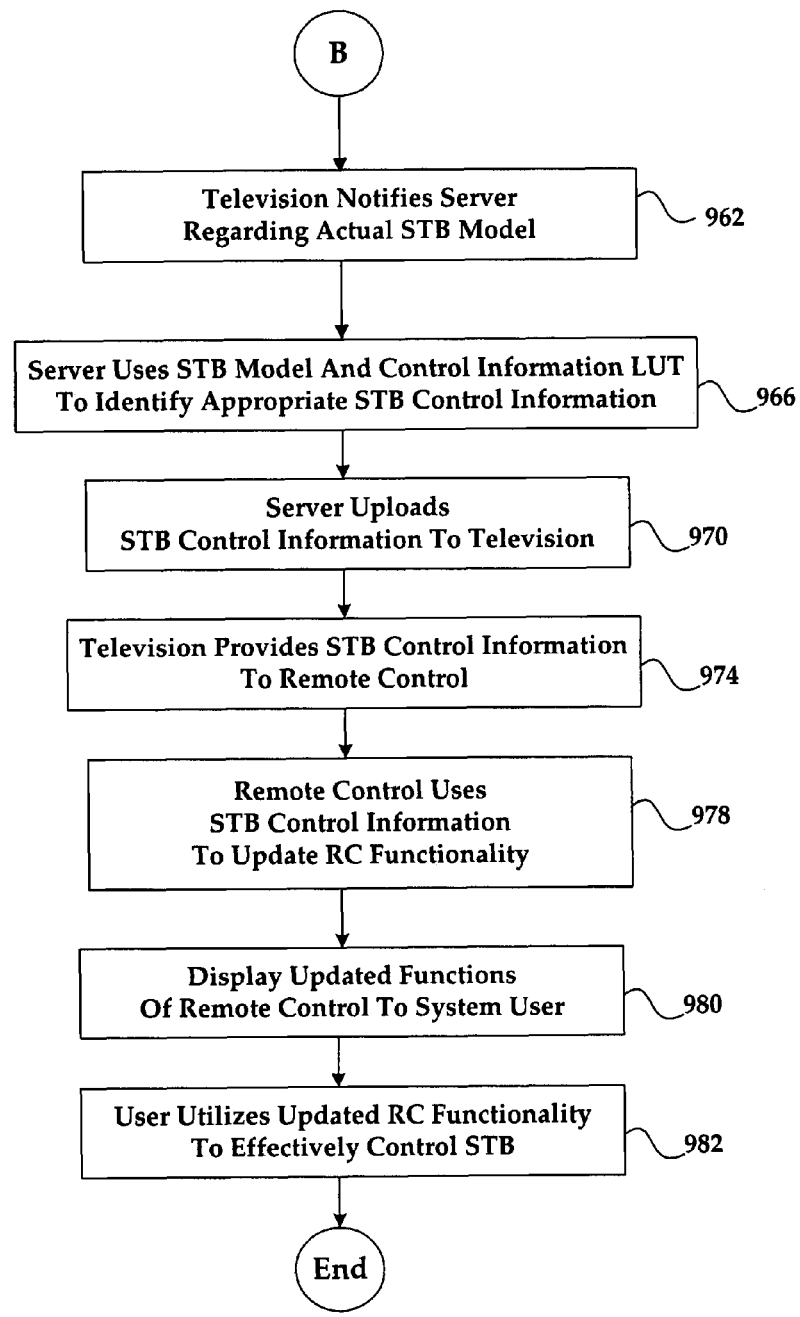

Referring now to FIGS. 9A through 9C, a flowchart of method steps for performing a remote control configuration procedure is shown, in accordance with one embodiment of the present invention. The FIG. 9 flowchart is presented for purposes of illustration, and in alternate embodiments, the present invention may perform remote control configuration procedures by utilizing steps and sequences other than certain of those steps and sequences discussed in conjunction with the embodiment of FIGS. 9A through 9C. For example, the FIG. 9 flowchart is discussed in the context of configuring a remote control 114 to include additional control functionalities for a settop box 126 from a television system 110 (FIG. 1). However, in various alternate embodiments, various other types of electronic devices are equally contemplated.

In the FIG. 9A embodiment, in step 914, the remote control configuration mode is entered in response to any predefined configuration trigger event. For example, a remote control configuration procedure may be automatically triggered when a television system 110 (FIG. 1) is initially installed. Alternately, remote control configuration procedures may be manually triggered by a system user in response to any appropriate event or occurrence, such as the introduction of a different settop box 126 into television system 110.

In step 918, an RC configuration module 326 of television 118 automatically logs into configuration server 126 (FIG. 1) by utilizing any appropriate techniques. For example, television 118 may transmit a network login communication, including an Internet Protocol (IP) address, to configuration server 126. In step 922, an RC configuration manager 726 of configuration server 142 responsively reads the IP address of television 118, and then accesses a locale lookup table 730 to determine a specific locale (approximate physical location) for television 118 based upon its corresponding IP address.

In step 926, RC configuration manager 726 next accesses a vendor lookup table 734 to determine one or more probable vendors for the particular settop box 126 of television system 110 based upon the previously-determined specific locale of television 118. In step 930, RC configuration manager 726 of configuration server 142 notifies RC configuration module 326 of television 118 regarding the one or more probable vendors of settop box 126, based upon information from vendor lookup table 734.

In step 934, RC configuration module 326 of television 118 displays one or more simple leading questions on a local display 222 (FIG. 1) to allow a system user to interactively confirm the actual vendor of the particular settop box 126 in a non-demanding and user-friendly manner. The FIG. 9A process then advances to step 938 of FIG. 9B through connecting letter "A." In step 938, the system user confirms the actual vendor of settop box 126 by utilizing any effective means. For example, the system user may utilize remote control 114 to respond to the vendor question(s) presented by television 118.

In step 942, the RC configuration module 326 of television 118 confirms the actual vendor of settop box 126 to the RC configuration manager 726 of configuration server 142. In step 946, RC configuration manager 726 responsively accesses a STB-model lookup table 738 to determine appropriate STB model information for the possible different settop boxes 126 based upon the actual vendor previously provided by television 118. The settop box model information may include any relevant types of information. For example, the settop box model information may include model numbers and digital images for the different types of settop boxes supported by the actual vendor at that specific locale.

In step 950, RC configuration manager 726 uploads the STB-model information to television 118. In step 954, the RC configuration module 326 of television 118 displays the received STB-model information on display 222, and asks one or more simple leading questions to allow the system user to interactively confirm the actual model of settop box 126 in a non-demanding and user-friendly manner. For example, in certain embodiments, television 118 may display, either sequentially or simultaneously, the digital images for the different types of settop boxes supported by the actual vendor at that specific locale.

In step 958, the system user may then confirm the actual model of settop box 126 in any effective and appropriate manner. For example, in certain embodiments, the system user may utilize remote control 114 to simply select the displayed digital image that resembles the settop box 126 of television system 110. The FIG. 9B process may the advance to step 962 of FIG. 9C through connecting letter "B." In step 962, the RC configuration module 326 of television 118 confirms the actual model of settop box 126 to the RC configuration manager 726 of configuration server 142.

In step 966, RC configuration manager 726 responsively accesses a control-information lookup table 742 to determine appropriate STB control information for the actual settop box 126, as indicated by the system user through television 118. The STB control information may include any relevant types of information. For example, in the FIG. 9C embodiment, the STB control information may include, but is not limited to, specific control codes to support various functions of STB 126 in television system 110.

In step 970, RC configuration manager 726 uploads the appropriate identified STB control information to television 118. In step 974, television 118 then provides the received STB control information to remote control 114 by utilizing any appropriate transmission techniques or methods. For example, television 118 may transfer the STB control information to remote control 114 by utilizing appropriate low-speed or high-speed radio-frequency transmissions. In certain embodiments, television 118 may alternately transfer the STB control information to remote control 114 by utilizing appropriate Near-Field Communication (NFC) techniques, as discussed above in conjunction with FIGS. 2 and 4.

In step 978, an RC configuration controller of remote control 114 may utilize the received STB control information to advantageously update remote control functionalities of remote control 114 to thereby support controlling both STB 126 and television 118. In step 980, the updated functions of remote control 114 may be displayed in any appropriate manner for review by a system user. Finally, in step 982, the system user may utilize the updated remote control functionality to effectively control STB 126. The FIG. 9 process may then terminate. For at least the foregoing reasons, the present invention thus provides an improved a system and method for effectively performing a remote control configuration procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively controlling an electronic system, comprising:
    a settop box that receives electronic programming from a program source;
    a television that is configured to reproduce said electronic programming; and
    a remote control that controls said television over an RC-TV communications link, said television automatically coordinating an entire set of handshaking steps for performing a configuration procedure with a configuration server to allow said remote control to also control said settop box over an RC-STB communication link, said configuration server being at a remote network location that is accessible by other network devices, said television automatically accessing STB control codes from said configuration server based upon a device type of said settop box for adding settop-box control functions to internally modify said remote control during said configuration procedure.

2. The system of claim 1 further comprising said configuration server that said television interacts with to identify and obtain said STB control information.

3. The system of claim 2 wherein said television communicates with said configuration server over an Internet network.

4. The system of claim 1 wherein said settop box is alternately implemented as a cable-television settop box or a satellite-television settop box.

5. The system of claim 1 wherein said configuration procedure is initiated in response to a configuration trigger event that alternately includes both an initial setup procedure for said television and a replacement installation of said settop box.

6. The system of claim 2 wherein said television automatically transmits a network login communication, including an IP address, to said configuration server, said configuration server responsively accessing a locale lookup table to determine a specific locale for said television based upon said IP address.

7. The system of claim 6 wherein said configuration server accesses a vendor lookup table to determine one or more probable vendors for said settop box based upon said specific locale of said television, said configuration server notifying said television regarding said one or more probable vendors for said settop box based upon vendor information from said vendor lookup table.

8. The system of claim 7 wherein said television displays a vendor identification question about said one or more probable vendors to allow a system user to utilize said remote control for interactively confirming an actual vendor of said settop box.

9. The system of claim 8 wherein said vendor identification question is formulated as a yes/no question for which said system user may respond either "yes" or "no".

10. The system of claim 8 wherein said television confirms said actual vendor of said settop box to said configuration server, said configuration server responsively accessing an STB-model lookup table to determine STB model information for possible settop boxes supported in said specific locale by said actual vendor, said configuration server then uploading said STB model information to said television.

11. The system of claim 10 wherein said STB model information includes both model numbers and digital images for said possible settop boxes supported by said actual vendor at said specific locale, said system user identifying one of said digital images and said model numbers displayed on said television.

12. The system of claim 10 wherein said television displays said STB model information, said television also displaying a model identification question about said possible settop boxes to allow said system user to utilize said remote control for interactively confirming an actual model of said settop box.

13. The system of claim 12 wherein said television confirms said actual model of said settop box to said configuration server, said configuration server responsively accessing a control-information lookup table to determine STB control information for said actual model of said settop box.

14. The system of claim 13 wherein said STB control information includes specific settop-box control codes to support adding said settop-box control functions to said remote control.

15. The system of claim 13 wherein said configuration server uploads said STB control information to said television, said television responsively providing said STB control information to said remote control.

16. The system of claim 15 wherein said television transfers said STB control information to said remote control by utilizing low-speed or high-speed radio-frequency transmissions over said RC-TV communications link.

17. The system of claim 15 wherein said television transfers said STB control information to said remote control by utilizing Near-Field Communication techniques.

18. The system of claim 15 wherein said remote control utilizes said STB control information to update remote control functionalities of said remote control to support controlling both said settop box and said television.

19. The system of claim 1 wherein said television generates an RC GUI for visually presenting to a system user a graphical representation of said remote control and current control button functions of said remote control after said configuration procedure has been performed.

20. The system of claim 19 wherein said RC function GUI includes function descriptor popups to indicate current control functionalities of specific identified remote-control buttons after said configuration procedure has been performed.

21. A method for effectively controlling an electronic system, comprising:
receiving electronic programming from a program source by utilizing a settop box;
reproducing said electronic programming with a television;
controlling said television with a remote control over an RC-TV communications link; and
performing a configuration procedure automatically with said television and a configuration server in an entire set of handshaking steps to allow said remote control to also control said settop box over an RC-STB communication link, said configuration server being at a remote network location that is accessible by other network device, said television automatically accessing STB control codes from said configuration server based upon a device type of said settop box for adding settop-box control functions to internally modify said remote control during said configuration procedure.

22. The method of claim 21 further comprising said configuration server that said television interacts with to identify and obtain said STB control information, said configuration server including a configuration database that is continually updated with current configuration information.

23. The method of claim 22 wherein said television communicates with said configuration server over an Internet network.

24. The method of claim 21 wherein said settop box is alternately implemented as a cable-television settop box or a satellite-television settop box.

25. The method of claim 21 wherein said configuration procedure is initiated in response to a configuration trigger event that alternately includes both an initial setup procedure for said television and a replacement installation of said settop box.

26. The method of claim 22 wherein said television automatically transmits a network login communication, including an IP address, to said configuration server, said configuration server responsively accessing a locale lookup table to determine a specific locale for said television based upon said IP address.

27. The method of claim 26 wherein said configuration server accesses a vendor lookup table to determine one or more probable vendors for said settop box based upon said specific locale of said television, said configuration server notifying said television regarding said one or more probable vendors for said settop box based upon vendor information from said vendor lookup table.

28. The method of claim 27 wherein said television displays a vendor identification question about said one or more probable vendors to allow a system user to utilize said remote control for interactively confirming an actual vendor of said settop box.

29. The method of claim 28 wherein said vendor identification question is formulated as a yes/no question for which said system user may respond either "yes" or "no."

30. The method of claim 28 wherein said television confirms said actual vendor of said settop box to said configuration server, said configuration server responsively accessing an STB-model lookup table to determine STB model information for possible settop boxes supported in said specific locale by said actual vendor, said configuration server then uploading said STB model information to said television.

31. The method of claim 30 wherein said STB model information includes both model numbers and digital images for said possible settop boxes supported by said actual vendor at said specific locale, said system user identifying one of said digital images and said model numbers displayed on said television.

32. The method of claim 30 wherein said television displays said STB model information, said television also displaying a model identification question about said possible settop boxes to allow said system user to utilize said remote control for interactively confirming an actual model of said settop box.

33. The method of claim 32 wherein said television confirms said actual model of said settop box to said configuration server, said configuration server responsively accessing a control-information lookup table to determine STB control information for said actual model of said settop box.

34. The method of claim 33 wherein said STB control information includes specific settop-box control codes to support adding said settop-box control functions to said remote control.

35. The method of claim 33 wherein said configuration server uploads said STB control information to said television, said television responsively providing said STB control information to said remote control.

36. The method of claim 35 wherein said television transfers said STB control information to said remote control by utilizing low-speed or high-speed radio-frequency transmissions over said RC-TV communications link.

37. The method of claim 35 wherein said television transfers said STB control information to said remote control by utilizing Near-Field Communication techniques.

38. The method of claim 35 wherein said remote control utilizes said STB control information to update remote control functionalities of said remote control to support controlling both said settop box and said television.

39. The method of claim 21 wherein said television generates an RC function GUI for visually presenting to a system user a graphical representation of said remote control and current control button functions of said remote control after said configuration procedure has been performed.

40. The method of claim 39 wherein said RC function GUI includes function descriptor popups to indicate current control functionalities of specific identified remote-control buttons after said configuration procedure has been performed.

41. The method of claim 35 wherein said television transfers said STB control information to said remote control by utilizing infrared transmissions over said RC-TV communications link.

42. The method of claim 21 wherein said remote control send electronic information to said television by utilizing infrared transmissions over said RC-TV communications link.

43. The method of claim 21 wherein said remote control sends electronic information to said television by utilizing radio-frequency transmissions over said RC-TV communications link.

44. The method of claim 21 wherein said remote control sends information to said television by utilizing Near-Field Communications techniques over said RC-TV communications link.

45. The method of claim 21 wherein said remote control sends information to said settop box over said RC-STB communication link by utilizing radio-frequency transmissions.

46. The method of claim 21 wherein said remote control sends information to said settop box over said RC-STB communication link by utilizing infrared transmissions.

47. The system of claim 28 wherein said vendor identification question is formulated as a yes/no question to which said system user may respond by selecting either a yes selection button or a no selection button displayed on said television.

48. The system of claim 28 wherein said vendor identification question is formulated as a yes/no question to which said system user may respond by using a touch screen on said remote control to select either a yes selection button or a no selection button displayed on said remote control.

49. The method of claim 21 wherein said remote control generates an RC GUI for visually presenting to a system user a graphical representation of said remote control and current control button functions of said remote control after said configuration procedure has been performed.

50. The method of claim 49 wherein said RC function GUI includes function descriptor popups to indicate current control functionalities of specific identified remote-control buttons after said configuration procedure has been performed.

51. The method of claim 30 wherein said STB model information includes model numbers and digital images for said possible settop boxes supported by said actual vendor at said specific locale, said system user identifying one of said digital images or said model numbers displayed on said television and/or a display screen of said remote control.

52. The method of claim 30 wherein said television and/or said remote control displays said STB model information, said television and/or said remote control also displaying a model identification question about said possible settop boxes to allow said system user to utilize said remote control for interactively confirming an actual model of said settop box.

53. The method of claim 35 wherein said television transfers said STB control information to said remote control by utilizing infrared transmission techniques.

54. The method of claim 21 wherein said remote control generates an RC function GUI on an RC display screen for visually presenting to a system user a graphical representation of said remote control and current control button functions of said remote control after said configuration procedure has been performed.

55. The method of claim 21 wherein said settop box sends information to said remote control over said RC-STB communication link by utilizing radio-frequency transmissions.

56. The method of claim 21 wherein said settop box sends information to said remote control over said RC-STB communication link by utilizing infrared transmissions.

57. The method of claim 28 wherein said vendor identification question is formulated as a yes/no question to which said system user may respond by using arrow keys on said remote control.

58. The method of claim 21 wherein said system user participates in said configuration procedure by utilizing a display screen of said television.

59. The method of claim 21 wherein said system user participates in said configuration procedure by utilizing a display screen of said remote control.

60. The method of claim 21 wherein said system user participates in said configuration procedure by utilizing display screens of both said television and said remote control.

61. The method of claim 21 wherein said system user participates in said configuration procedure by utilizing display screens of said television and/or said remote control.

62. A system for effectively controlling a television system, comprising:
   a cable-television settop box that receives electronic programming from a cable-network program source;
   a television that is configured to reproduce said electronic programming upon a display screen;
   a configuration server that stores STB control codes for said cable-television settop box; and
   a remote control that controls said television over a wireless RC-TV communications link, said television and said configuration server automatically coordinating an entire set of handshaking steps for performing a configuration procedure to allow said remote control to also control said settop box over an RC-STB communication link, said configuration server being at a remote network location that is accessible by other network devices, said television automatically accessing said STB control codes from said configuration server based upon a device type of said settop box for adding settop-box control functions to internally modify said remote control, said television providing a graphical-user-interface for identifying a correct version of said STB control information, and for visually indicating said settop-box control functions on an displayed image of said remote control.

63. A system for effectively controlling a television system, comprising:
  a satellite-television settop box that receives electronic programming from a satellite-network program source;
  a television that is configured to reproduce said electronic programming upon a display screen;
  a configuration server that stores STB control codes for said satellite-television settop box; and
  a remote control that controls said television over a wireless RC-TV communications link, said television and said configuration server automatically coordinating an entire set of handshaking steps for performing a configuration procedure to allow said remote control to also control said settop box over an RC-STB communication link, said configuration server being at a remote network location that is accessible by other network devices, said television automatically accessing said STB control codes from said configuration server based upon a device type of said settop box for adding settop-box control functions to internally modify said remote control, said television providing a graphical-user-interface for identifying a correct version of said STB control information, and for visually indicating said settop-box control functions on an displayed image of said remote control.

* * * * *